United States Patent Office 2,870,037
Patented Jan. 20, 1959

2,870,037
PROCESS FOR TREATING GRASS

Sherman Converse, Aiken, S. C., assignor to Graniteville Company, Graniteville, S. C., a corporation of South Carolina No Drawing. Application April 10, 1958
Serial No. 727,553

11 Claims. (Cl. 117—3)

This invention relates to the treatment of grass which has become discolored or turned brown by reason of drought, disease, cold weather or other causes, and more particularly to the permanent restoration of a natural life-like appearance to such grass and the protection of such grass from deterioration.

In many sections of the country perennial grasses such as used on lawns, etc., turn brown following the arrival of cold weather in the fall of the year and lie dormant until spring. In the warmer sections it is common practice to sow over the brown perennial grass a type of rye grass seed which will grow in these sections in the winter and die out completely on the arrival of warm weather in the spring. Such practice is being frowned upon more and more by agronomists since the sowing of the rye grass each winter has a bad effect on the condition of the perennial grass. Treatment of the dormant perennial grass in the manner described herein does not damage such grass and has the advantage of eliminating the labor and expense of watering, fertilizing and mowing required in the case of winter grass. In the spring the new perennial grass shoots come up just as they would if the dormant grass had remained untreated.

Grass, whether perennial or otherwise, may also become discolored from other causes such as drought or disease and the invention is also useful in treating such grasses to permanently protect them from deterioration through mechanical action and to permanently impart thereto a natural green color.

The principal object of the invention therefore is to treat discolored grass by the application thereto of a natural green colored protective coating such that the treated grass will regain the color and appearance of living grass and will retain this color and appearance without change until replaced by new growth. This may be accomplished by the application to discolored grass of certain aqueous dispersions of film-forming, water-insoluble resinous binders containing water-insoluble coloring matter, whereby the treated grass is not only given a permanent natural green color, but is also permanently coated with a tough, flexible, adhesive, cohesive, weather, water and abrasion resistant film which tightly adheres to the grass when the dispersion dries and protects the treated grass from deterioration or crumbling through mechanical action.

The terms "permanent" and "permanently" as used herein and in the appended claims in reference to the length of time the treated grass retains the benefits of the treatment means that the protective colored film remains on the treated grass until such grass is replaced by new growth. This length of time varies from a few weeks to several months depending on locality and weather conditions. These factors do not affect the treated grass but only the emergence of the new growth which replaces the treated grass.

The invention is particularly suitable for the treatment of lawns, cemetery lots, athletic fields, etc. Numerous commercial applications have shown that the coating does not change color noticeably over a period of up to six months, does not rub off on shoes or clothing which may come in contact with it, even when wet, and is not affected by rain or snow or by continued foot traffic.

In order to attain this objective it has been discovered, in accordance with the invention, that a composition is required such that the film or coating it produces will meet certain standards of performance with respect to the following physical properties: water resistance, abrasion resistance, wet and dry crock resistance, adhesion, breaking strength and elongation, and weather resistance. These properties are determined by testing films formed from the composition on any suitable surface such as glass or mercury. The tests are performed in accordance with standard test methods and the results expressed in numerical terms.

The test methods used are as follows:

(1) *Water resistance.*—Water resistance is measured by the ASTM tentative test method D570–54T for determination of the degree of water absorption of plastics. The test is carried out on a 5 mil (.005") film prepared by coating or spraying the composition on a suitable surface and allowing to dry. The film is removed, dried for 1 hour at 105°–110° C., and weighed. It is then soaked in water for 24 hours at 23° C. The film is then removed, all surface water wiped off with a dry cloth and immediately weighed. The increase in weight divided by the original weight gives the percentage water absorption.

(2) *Abrasion resistance.*—Abrasion resistance is measured by testing a 5 mil film prepared as above on the Taber abraser using a CS–10 wheel and a 500 gram weight. The number of revolutions required to wear a hole in the film is a measure of the abrasion resistance.

(3) *Crock resistance.*—Crock resistance is measured by testing a 5 mil film on the AATCC crockmeter by the method described on pages 75–76 of the 1956 Technical Manual and Year Book of the American Association of Textile Chemists and Colorists. In this apparatus a 2" square of white, bleached cotton cloth (lawns, percales or printed cloths are suitable) is placed on the end of a peg or finger and the peg is rubbed back and forth over the surface of the film 10 times for a distance of about six inches. For a dry crock test the cloth is dry and for a wet crock test the cloth is wet with water. The amount of color picked up by the cloth is compared with a standard AATCC color transference evaluation chart. This chart consists of four rows of six colors each, namely, neutral gray, red, yellow, green, blue and purple. Each row is a different depth ranging from a light tint in row 4 to a moderately deep shade in row 1. The amount of color on the white cloth is compared with the chart and the degree of fastness to crocking expressed as a class No. according to the row containing the color chip to which the stain on the white cloth most closely corresponds. If this chip is in row 1 the crock fastness is in class 1, row 2 is class 2, etc. Class 5 is the best, showing virtually no color transfer to the white cloth.

(4) *Adhesion.*—Adhesion is measured by casting a 5 mil film on glass, marking off a 1-inch wide strip about 5 inches long by cutting with a knife, peeling one end of the strip, placing this end in a clamp attached to one arm of a pair of scales, placing weights in a pan attached to the other arm of the scales, and determining the weight required to pull the strip from the glass a distance of ¼" per minute. In case the breaking strength of the film is not sufficient to overcome the adhesive force between the film and the glass, a pressure sensitive adhesive tape 1 inch in width or less may be applied to the top surface of the strip of film in order to furnish the necessary tensile strength.

(5) *Breaking strength and elongation.*—Breaking strength and elongation are determined on a film testing machine having a pendulum weighing head to measure the load applied to break the specimen. A strip of film approximately 5 mils (.005 inch) thick, 5 inches long, and 1 inch wide is used for the test. The strip is placed in the grips of the tester and the grips moved apart at a constant rate until the film breaks. The rate of motion of the powered grip is 2 inches per minute for films with an ultimate elongation less than 100 percent, and 20 inches per minute for films with an ultimate elongation of 100 percent or more. The initial distance between the grips, or gage length, shall be 1 inch for materials having a total elongation at break of 100 percent or more and 3 inches for materials having a total elongation at break of less than 100 percent. The machine is equipped with a device for indicating the tensile load carried by the specimen. Breaking strength, or breaking factor, is calculated by dividing the load at break in pounds by the original width of the specimen in inches and is expressed in pounds per inch.

Elongation is a measure of the elasticity and, to some degree, of the flexibility of the film. Percentage maximum elongation is calculated by dividing the elongation at the moment of rupture of the specimen by the original length of the measured elongating section.

(6) *Weather resistance.*—Weather resistance is determined by exposing a 5 mil film in an Atlas twin arc weatherometer. This apparatus is equipped with two carbon arc lamps and water sprays automatically regulated to spray the test sample for a 9-minute period at 51-minute intervals. The sample is, therefore, alternately wet and dried. All other conditions of the test are in accordance with Method 5004 of Federal Specification CCC—T—191B. This apparatus provides an accelerated test of the resistance of the material to weather exposure by measuring the color fastness or resistance to fading of the color pigments as shown by the degree of color change, and also by measuring the resistance of the film-forming resinous binder to deterioration as shown by a change in appearance or condition of the film brought about by cracking, blistering, or wrinkling, or by bleeding or mechanical loss of color. The degree of weather resistance is expressed as the number of hours' exposure required to produce an appreciable change in color or appearance of the film.

All films are dried at room temperature and conditioned for a minimum of 24 hours at a temperature of 70° F. and 65% relative humidity, and all of the foregoing tests, except the water resistance and weather resistance tests, are conducted under these same temperature and humidity conditions. The water and weather resistance tests are carried out under the conditions described in the foregoing explanations of these test methods.

The following represents the physical property value limitations, as measured by the foregoing test methods, applicable to 5 mil (.005") films produced from compositions which, in accordance with the invention, will produce satisfactory results in use:

Water resistance—not over 150% water absorption.
Abrasion resistance—not less than 75 revolutions.
Crock resistance—class 2 or better.
Adhesion—not less than 1½ ounces.
Breaking strength—not less than ¾ pound.
Elongation—not less than 25%.
Weather resistance—not less than 100 hours.

Each one of the physical properties listed above has an effect on the quality of the protective film and its utility for its intended purpose. A certain degree of breaking strength, abrasion resistance, and adhesion is necessary in order that the film on the grass will satisfactorily resist removal from the grass by any mechanical action such as being walked on. Also, browned-out grass tends to be brittle and "crumbly" and a film having the necessary degree of strength, abrasion resistance, and adhesion will protect the blades of grass from being broken up by any mechanical action such as being walked on or by the action of wind and rain. Good crock resistance is necessary to prevent the color from rubbing off on the person or clothing of anyone coming in contact with the colored grass. Good color retention and resistance to weather exposure is necessary in order that the colored glass will retain its original appearance for the desired length of time. A low degree of water absorption is required as absorption of water weakens the film and lowers its tensile strength, abrasion resistance and adhesion.

Several attempts have been made in the past to provide grass coloring compositions. For instance, Monteith in U. S. Patent No. 2,113,625 employs a solution of water-soluble fugitive dyestuffs. Lockrey et al., in U. S. Patent No. 2,714,062 discloses a method of providing a temporary coloration by the use of a water-soluble dyestuff and a water-soluble binder in combination with a fertilizer mixture. Gardner et al., in U. S. Patent No. 2,786,821 discloses certain combinations of water-soluble dyestuffs, water-insoluble pigments and aqueous dispersions of water-insoluble binders.

None of these compositions meet the minimum physical property values of the herein described invention and, therefore, do not fulfill its purpose, namely, providing on grass a permanent, tough, flexible, cohesive, adhesive, weather, water, and abrasion-resistant natural green-colored film which will not change in color, will not rub off on shoes or clothing which may come in contact with it, is not affected by rain or slow, and which protects the treated grass from deterioration by continued foot traffic.

It has been found, according to the invention, that certain compositions of aqueous dispersions or emulsions of certain film-forming, water-insoluble resins used as the binder or vehicle for certain water-insoluble coloring matter, such as pigments or certain oil and solvent soluble dyestuffs or combinations thereof, fulfill the minimum requirements with respect to the physical properties listed above.

Resinous binders which may be employed include aqueous dispersions or emulsions of interpolymers produced from mixtures of various polymerizable acrylic monomers such as methyl acrylate, ethyl acrylate, propyl acrylate, isopropyl acrylate, butyl acrylate, isobutyl acrylate, sec. butyl acrylate, 2-ethyl hexyl acrylate, dodecyl acrylate, methyl methacrylate, butyl methacrylate, isobutyl methacrylate, tert. butyl methacrylate, acrylic acid, methacrylic acid, itaconic acid, ammonium methacrylate. Also, aqueous dispersions or emulsions of polymers or interpolymers produced from polymerizable monomers such as vinyl acetate, vinyl propionate, vinyl chloride, vinylidene chloride, butadiene, styrene, acrylonitrile, dibutyl maleate, ethyl acrylate or mixtures thereof; and aqueous dispersions or emulsions of interpolymers produced from mixtures of these monomers with any of the above mentioned acrylic monomers. Also aqueous emulsions of alkyd resins and oil-modified alkyd resins, including oxidizing and non-oxidizing, long, medium or short oil, either cut with solvents such as toluol, xylol or mineral spirits or in 100% solids form, may be used as the sole binder or in admixture with the above and below mentioned resinous binders. Other binders which would not be suitable as the sole binder but which may be used in varying amounts with the above mentioned binder dispersions are aqueous dispersions of coumarone-indene, phenolic, chlorinated diphenyl, rosin, and modified rosin, ester gum, natural resins and polymerized petroleum hydrocarbon resins.

An example of a preferred binder, chosen because of its desirable physical properties including stability to both storage and agitation in addition to the other desirable physical properties enumerated herein, is an aqueous dispersion (46% solids) of interpolymer produced by emulsion polymerization of the following mixture of monomers: ethyl acrylate—66%, methyl methacrylate—

32.75%, methacrylic acid—1.25%. This is the binder employed in Examples 1, 2, 8, 9, 10 and 11 herein and it is derived from a solution of 25 parts of an octylphenoxypolyethoxyethanol having about 30 ether groups in 1000 parts of water to which is added with stirring a mixture of 280 parts of ethyl acrylate, 140 parts of methyl methacrylate, and 5.5 parts of methacrylic acid. The resulting mixture is cooled to 15° C. A solution of 0.5 part of ammonium persulfate in 1.5 parts of water is then added, followed by addition of a solution of 0.6 part of sodium hydrosulfite in six parts of water. Stirring is continued. In a few minutes the temperature of the mixture begins to rise and continues to rise, reaching about 65° C. in a half hour. After five minutes the mixture is cooled to about 15° C. There are now added 35 parts of the same octylphenoxypolyethoxyethanol, 315 parts of ethyl acrylate, 155 parts of methyl methacrylate, 6 parts of methacrylic acid, a solution of 0.6 part of ammonium persulfate in 1.5 parts of water, and 0.8 part of sodium hydrosulfite in six parts of water. In a short time the temperature of the mixture rises, a maximum of about 65° C. again being reached. Stirring is continued for an hour and then while the batch is cooled to 30° C., ammonium hydroxide solution is added until a pH of 9.5 is reached. The resulting product is a dispersion of an interpolymer of ethyl acrylate, methyl methacrylate, and methacrylic acid in over a 99% yield.

Pigments, which are of course water-insoluble, employed in the coating composition may be any of the chrome yellows, cadmium yellows, Hansa yellows, which are acetoacetic arylide couplings with substituted anilines, like 4-chloro-2-nitro-aniline, or orthonitraniline, among others, Benzidine yellows, which are couplings between dichlorobenzidine or acetoacetic acylides, such as the aceto-acetic-anilide, -ortho chloro anilide, Phthalocyanine blue, which is a copper or tin-copper phthalocyanine, Phthalocyanine green, which is a chlorinated copper phthalocyanine, and Chromium Oxide greens. In the coating formulations, these pigments are employed in the form of water-dispersible pastes which may or may not contain emulsifiable oil or resinous binders.

In order to maintain good pigment dispersions thus preventing too great a degree of fluocculation and settling, wetting agents, dispersing agents and thickening agents may be used. In order to promote faster film formation and improve film integrity, various liquids having a solvent action on the particular resin present, may be used. In order to improve pigment wetting and thus derive maximum color value from the pigments various emulsifiable oils and oil-containing resins such as alkyds, and also plasticizers and solvents may be used.

Other water-insoluble coloring matter which may be employed in the coating composition are oil or solvent soluble dyestuffs, but not water-soluble dyestuffs, and these may be used in addition to or in lieu of pigments.

Among the thickening agents which may be employed are included methyl cellulose, sodium carboxymethyl cellulose, hydroxyethyl cellulose, sodium acrylate, and ammonium polyacrylate.

As dispersing agents there may be employed Calgon (sodium hexametaphosphate), Daxad (sodium salt of polymerized alkyl naphthalene sulphonic acid) and ammonium caseinate.

As wetting agents, where they are desirable, there may be employed Aerosol OT (dioctyl sodium sulfosuccinate), Santomerse D (decyl benzene sodium sulfonate) and various soaps such as those formed through the interreaction of oleic acid and morpholine or ammonia.

It will be apparent to those skilled in the art that mixtures of two or more resins or resinous binders in the coating formulations are contemplated, as well as mixtures of pigment pastes to give the desired color shade. Moreover, mixtures of thickening agents as well as mixtures of wetting and dispersing agents are contemplated.

It should be understood that the success of the coating composition is not dependent upon the use of any particular resinous binder, nor is it dependent upon the use of any particular colored pigment, but rather upon the use of such binders and pigments and auxiliary agents, if any, which, when properly formulated, produce a film having the aforesaid physical properties. Stated differently, the use of any water-insoluble resinous binder and any desired water-insoluble coloring matter is contemplated just so long as the combination thereof forms a film having the physical properties described above. Other resinous binders and color pigments will occur to those skilled in the art.

The following are specific examples of compositions which have produced excellent results in a large number of commercial applications:

Example 1

2 lbs. 12 ozs. aqueous dispersion (46% solids) of interpolymer produced by emulsion polymerization of the following mixture of monomers: ethyl acrylate—66%, methyl methacrylate—32¾%, methacrylic acid—1¼%

7½ ozs. Phthalocyanine Green Paste (CI-74260, dispersion of organic pigment in water—35% solids)

15 ozs. Hansa Yellow G Paste (CI-11680, dispersion of organic pigment in water—40% solids)

6½ ozs. Chromium Oxide Paste (dispersion of inorganic pigment in water—68% solids)

⅜ oz. ammonium polyacrylate (emulsion thickener—30% solids)

¼ oz. oleic acid ⎫
⅜ oz. ammonia ⎭ (wetting and dispersing agent)

3 lbs. 12 ozs. water

Total weight—8 lbs. 6 ozs. Total volume—1 gallon.
Weight of dry solids—2 lbs. 1.75 ozs. Percent dry solids—25%.

The total weight of binder and pigment solids in this concentrate is 2 pounds 1.3 ounces and the ratio of binder solids to pigment solids is 1.6 to 1.0. When the concentrate was diluted to a sprayable consistency, in this case in the proportion of 1 part concentrate to 5 parts water by volume, and applied to 1500 square feet of dormant grass, 6 gallons of spray mix (1 gallon of concentrate plus 5 gallons of water) deposited 2.2 ounces of solid material per 100 square feet. This produced a pleasing natural grass color which remained unchanged throughout the dormancy period of four months.

Film formed from the above concentrate exhibited the following physical properties when subjected to the tests previously described herein:

Adhesion _____ 12.5% absorption.
Water resistance _____ 2200 revolutions.
Abrasion resistance _____ 1½ ounces.
Crock resistance, class:
  Dry, 3.
  Wet, 3.
Breaking strength _____ 2 pounds per inch.
Elongation _____ 560%.
Weather resistance _____ 1000 hours.

Example 2

2 lbs. 9 ozs. aqueous dispersion (46% solids) of interpolymer produced by emulsion polymerization of the following mixture of monomers: ethyl acrylate—66%, methyl methacrylate—32¾%, methacrylic acid—1¼%

9¼ ozs. Phthalocyanine Green Paste (CI-74260, 58% solids, composed of 30% pigment solids and 28% binder solids)

17½ ozs. Hansa Yellow G Paste (CI-11680, dispersion of organic pigment in water—40% solids)

½ oz. ammonium polyacrylate emulsion thickener (30% solids)

3¼ ozs. methyl cellulose, 4000 cp. (1% solution)
½ oz. ammonia
4 lbs. 2 ozs. water Total Weight—8 lbs. 10 ozs. Total volume—1 gallon.
Weight of dry solids—1 lb. 15.4 ozs. Percent dry solids—22%.

The total weight of binder and pigment solids in this concentrate is 1 pound 15.2 ounces and the ratio of binder solids to pigment solids is 2.2 to 1.0. When diluted with 5 gallons of water and applied to 1500 square feet of grass the weight of solid material deposited per 100 square feet was 2.1 ounces. This also produced a pleasing natural grass color which remained unchanged over a period of four months.

Test results on the above formulation are as follows:

Water resistance _____ 5% absorption.
Abrasion resistance _____ 2000 revolutions.
Crock resistance, class:
    Dry, 4.
    Wet, 4.
Adhesion _____ 3 ounces.
Breaking strength _____ 2¾ pounds per inch.
Elongation _____ 750%.
Weather resistance _____ 1200 hours.

The Phthalocyanine Green Paste in the foregoing example is composed of:

30% Phthalocyanine Green pigment
17.5% partially neutralized ester of linseed oil (100% solids)
17.5% non-drying phthalic alkyd resin (60% solids in xylol)
35% methyl Cellosolve (ethylene glycol mono methyl ether).

This composition emulsifies easily in water containing an alkali such as ammonia and gives better color value than conventional water pastes. It is added to the water and ammonia before being mixed with the remainder of the concentrate.

Other formulations which have been tested and found to produce entirely satisfactory results are as follows:

Example 3

2 lbs. 11 ozs. emulsion copolymer of 62.5% vinyl acetate and 37.5% dibutyl maleate (55% solids)
7½ ozs. Phthalocyanine Green Paste (CI–74260, dispersion of organic pigment in water—35% solids)
15 ozs. Hansa Yellow G Paste (CI–11680, dispersion of organic pigment in water—40% solids)
6½ ozs. Chromium Oxide Paste (dispersion of inorganic pigment in water—68% solids)
⅛ oz. ammonium polyacrylate emulsion thickener (30% solids)
1 oz. ammonia
4 lbs. 5¾ ozs. water Total weight—8 lbs. 14⅜ ozs. Total volume—1 gallon.
Weight of dry solids—2 lbs. 4¾ ozs. Percent dry solids—26%.

Diluted to a sprayable consistency and applied to 1500 square feet of grass, the weight of solid material deposited per 100 square feet is 2.4 ounces. Ratio of binder solids to pigment solids is 1.8 to 1.0.

Test results on film formed from the above formulation are as follows:

Water resistance _____ 15% absorption.
Abrasion resistance _____ 3000 revolutions.
Crock resistance, class:
    Dry, 3.
    Wet, 3.
Adhesion _____ 8 ounces.
Breaking strength _____ 4½ pounds per inch.
Elongation _____ 200%.
Weather resistance _____ 900 hours.

Example 4

2 lbs. 11 ozs. 40% butadiene-60% styrene copolymer latex (50% solids)
7½ ozs. Phthalocyanine Green Paste (CI–74260, dispersion of organic pigment in water—35% solids)
15 ozs. Hansa Yellow G Paste (CI–11680, dispersion of organic pigment in water—40% solids)
6½ ozs. Chromium Oxide Paste (dispersion of inorganic pigment in water—68% solids)
⅜ ozs. ammonium polyacrylate emulsion (30% solids)
4 lbs. 3⅞ ozs. water
1 oz. ammonia Total weight—8 lbs. 13¼ ozs. Total volume—1 gallon.
Weight of dry solids—2 lbs. 2½ ozs. Percent dry solids—24%.

Diluted to a sprayable consistency and applied to 1500 square feet of grass, the weight of solid material deposited per 100 square feet is 2.3 ounces. Ratio of binder solids to pigment solids is 1.6 to 1.0.

Test results on film from the above formulation show the following:

Water resistance _____ 16% absorption.
Abrasion resistance _____ 525 revolutions.
Crock resistance, class:
    Dry, 3.
    Wet, 2.
Adhesion _____ 2½ ounces.
Breaking strength _____ 2 pounds per inch.
Elongation _____ 600%.
Weather resistance _____ 300 hours.

Example 5

2 lbs. 12½ ozs. aqueous emulsion of soya oil modified glyceryl phthalate alkyd resin—24% phthalic anhydride, 65% oil (46% solids)
7½ ozs. Phthalocyanine Green Paste (CI–74260, dispersion of organic pigment in water—35% solids)
15 ozs. Hansa Yellow G Paste (CI–11680, dispersion of organic pigment in water—40% solids)
6½ ozs. Chromium Oxide Paste (dispersion of inorganic pigment in water—68% solids)
⅛ oz. ammonium polyacrylate emulsion (30% solids)
¾ oz. ammonia
⅝ oz. drier (emulsion of cobalt naphthenate—50% solids)

Total weight—4 lbs. 11 ozs. Total volume—½ gallon.
Weight of dry solids—2 lbs. 2 ozs. Percent dry solids—45%.

Diluted to a sprayable consistency and applied to 1500 square feet of grass, the weight of solid material deposited per 100 square feet is 2.2 ounces. Ratio of binder solids to pigment solids is 1.6 to 1.0.

Test results on the above are:

Water resistance _____ 55% absorption.
Abrasion resistance _____ 100 revolutions.
Crock resistance, class:
    Dry, 2.
    Wet, 2.
Adhesion _____ 10 ounces.
Breaking strength _____ 1½ pounds per inch.
Elongation _____ 25%.
Weather resistance _____ 100 hours.

Example 6

2 lbs. 11 ozs. aqueous dispersion of 40% vinyl chloride, 40% vinylidene chloride, 20% 2-ethylhexyl acrylate copolymer (52.7 solids)
7½ ozs. Phthalocyanine Green Paste (CI–74260, dispersion of organic pigment in water—35% solids)

15 ozs. Hansa Yellow G Paste (CI–1680, dispersion of organic pigment in water—40% solids)
6½ ozs. Chromium Oxide Paste (dispersion of inorganic pigment in water—68% solids)
⅛ oz. ammonium polyacrylate emulsion (30% solids)
4 lbs. 8⅜ ozs. water
1 oz. ammonia Total weight—9 lbs. 1½ ozs. Total volume—1 gallon. Weight of dry solids—2 lbs. 4½ ozs. Percent dry solids—25%.

Diluted to a sprayable consistency and applied to 1500 square feet of grass, the weight of solid material deposited per 100 square feet is 2.3 ounces. Ratio of binder solids to pigment solids is 1.7 to 1.0.

Test results on film from the above formulation show the following:

Water resistance _____ 10% absorption.
Abrasion resistance _____ 3000 revolutions.
Crock resistance, class:
  Dry, 4.
  Wet, 2.
Adhesion _____ 2 ounces.
Breaking strength _____ 8 pounds.
Elongation _____ 200%.
Weather resistance _____ 150 hours.

*Example 7*

2 lbs. aqueous dispersion of polyethyl acrylate—50% solids
6¼ ozs. Phthalocyanine Green Paste (CI–74260, dispersion of organic pigment in water—35% solids)
13¾ ozs. Hansa Yellow G Paste (CI–11680, dispersion of organic pigment in water—40% solids)
6½ ozs. Chromium Oxide Paste (dispersion of inorganic pigment in water—68% solids)
4 lbs. 13 ozs. methyl cellulose, 4000 cp. (1% solution)
1½ ozs. ammonia
1½ ozs. oleic acid Total weight—8 lbs. 10½ ozs. Total volume—1 gallon. Weight of dry solids—1 lb. 14¼ ozs. Percent dry solids—22%.

Diluted to a sprayable consistency and applied to 1500 square feet of grass, the weight of solid material deposited per 100 square feet is 1.9 ounces. Ratio of binder solids to pigment solids is 1.3–1.0.

Test results on the above formulation are as follows:

Water resistance _____ 150% absorption.
Abrasion resistance _____ 75 revolutions.
Crock resistance, class:
  Dry, 4.
  Wet, 2.
Adhesion _____ 1½ ounces.
Breaking strength _____ ¾ pound per inch.
Elongation _____ 3000%.
Weather resistance _____ 500 hours.

*Example 8*

1 lb. 6 ozs. aqueous dispersion (46% solids) of interpolymer produced by emulsion polymerization of the following mixture of monomers: Ethyl acrylate—66%, methyl methacrylate—32¾% methacrylic acid—1¼%
7½ ozs. Phthalocyanine Green Paste (CI–74260, dispersion of organic pigment in water—35% solids)
15 ozs. Hansa Yellow G Paste (CI–11680, dispersion of organic pigment in water—40% solids)
6½ ozs. Chromium Oxide Paste (dispersion of inorganic pigment in water—68% solids)
⅛ oz. ammonium polyacrylate emulsion (30% solids)
¼ oz. oleic acid
⅜ oz. ammonia
5 lbs. 9 ozs. water Total weight—8 lbs. 12¾ ozs. Total volume—1 gallon. Weight of dry solids—1 lb. 7½ ozs. Percent dry solids—16%.

Diluted to a sprayable consistency and applied to 1500 square feet of grass, the weight of solid material deposited per 100 square feet is 1.5 ounces. Ratio of binder solids to pigment solids is .77–1.0.

Test results on the above formulation are as follows:

Water resistance _____ 35% absorption.
Abrasion resistance _____ 250 revolutions.
Crock resistance, class:
  Dry, 3.
  Wet, 2.
Adhesion _____ 6 ounces.
Breaking strength _____ 2 pounds.
Elongation _____ 150%.
Weather resistance _____ 250 hours.

*Example 9*

2 lbs. 11 ozs. aqueous dispersion (46% solids) of interpolymer produced by emulsion polymerization of the following mixture of monomers: ethyl acrylate—66%, methyl methacrylate—32¾%, methacrylic acid—1¼%
9¼ ozs. Phthalocyanine Green Paste (CI–74260, 58% solids, composed of 30% pigment solids and 28% binder solids)
17½ ozs. Hansa Yellow G Paste (CI–11680, dispersion of organic pigment in water—40% solids)
¾ ozs. ammonium polyacrylate emulsion (30% solids)
½ oz. ammonia
4 lbs. 3 ozs. water Total weight—8 lbs. 10 ozs. Total volume—1 gallon. Weight of dry solids—2 lbs. Percent dry solids—23%.

Diluted to a sprayable consistency and applied to 1500 square feet of grass, the weight of solid material deposited per 100 square feet is 2.0 ounces. Ratio of binder solids to pigment solids is 2.3 to 1.0.

Test results on the above formulation are as follows:

Water resistance _____ 30% absorption.
Abrasion resistance _____ 2000 revolutions.
Crock resistance, class:
  Dry, 4.
  Wet, 3.
Adhesion _____ 3 ounces.
Breaking strength _____ 2½ pounds per inch.
Elongation _____ 800%.
Weather resistance _____ 900 hours.

The Phthalocyanine Green Paste in the foregoing example is composed of:

30% Phthalocyanine Green pigment
17.5% partially neutralized ester of linseed oil (100% solids)
17.5% non-drying phthalic alkyd resin (60% solids in xylol)
35% methyl Cellosolve (ethylene glycol mono methyl ether).

This composition emulsifies easily in water containing an alkali such as ammonia and gives better color value than conventional water pastes. It is added to the water and ammonia before being mixed with the remainder of the concentrate.

*Example 10*

5 lbs. 9 ozs. aqueous dispersion (46% solids) of interpolymer produced by emulsion polymerization of the following mixture of monomers: ethyl acrylate—66%, methyl methacrylate—32¾%, methacrylic acid—1¼%

7½ ozs. Phthalocyanine Green Paste (CI-74260, dispersion of organic pigment in water—35% solids)
15 ozs. Hansa Yellow G Paste (CI-11680, dispersion of organic pigment in water—40% solids)
6½ ozs. Chromium Oxide Paste (dispersion of inorganic pigment in water—68% solids)
¾ oz. ammonia
1 lb. 9 ozs. water Total weight—8 lbs. 15¾ ozs. Total volume—1 gallon. Weight of dry solids—3 lbs. 6 ozs. Percent dry solids—37%.

Diluted to a sprayable consistency and applied to 1500 square feet of grass, the weight of solid material deposited per 100 square feet is 3.6 ounces. Ratio of binder solids to pigment solids is 3.1 to 1.0.

Test results on the above formulation are as follows:

Water resistance _____ 20% absorption
Abrasion resistance _____ 5000 revolutions
Crock resistance, class:
    Dry, 4.
    Wet, 3.
Adhesion _____ 2¾ ounces.
Breaking strength _____ 5 pounds per inch.
Elongation _____ 1350%.
Weather resistance _____ 1500 hours.

*Example 11*

2 lbs. 11 ozs. aqueous dispersion (46% solids) of interpolymer produced by emulsion polymerization of the following mixture of monomers: ethyl acrylate—66%, methyl methacrylate—32¾%, methacrylic acid—1¼%
10 ozs. Phthalocyanine Green Paste (CI-74260, 58% solids composed of 30% pigment solids and 28% binder solids)
14 ozs. Benzidine Yellow G Paste (CI-21090, dispersion of organic pigment in water—40% solids)
⅛ oz. ammonium polyacrylate emulsion (30% solids)
⅝ oz. ammonia
4 lbs. 6 ozs. water Total weight—8 lbs. 9¾ ozs. Total volume—1 gallon. Weight of dry solids—1 lb. 15 ozs. Percent dry solids—22%.

Diluted to a sprayable consistency and applied to 1500 square feet of grass, the weight of solid material deposited per 100 square feet is 2.1 ounces. Ratio of binder solids to pigment solids is 2.6 to 1.0.

Test results on the above formulation are:

Water resistance _____ 5% absorption.
Abrasion resistance _____ 2000 revolutions.
Crock resistance, class:
    Dry, 3.
    Wet, 3.
Adhesion _____ 2⅝ ounces.
Breaking strength _____ 2¾ pounds per inch.
Elongation _____ 900%.
Weather resistance _____ 500 hours.

The Phthalocyanine Green Paste in the foregoing example is composed of:

30% Phthalocyanine Green pigment
17.5% partially neutralized ester of linseed oil (100% solids)
17.5% non-drying phthalic alkyd resin (60% solids in xylol)
35% methyl Cellosolve (ethylene glycol mono methyl ether)

This composition emulsifies easily in water containing an alkali such as ammonia and gives better color value than conventional water pastes. It is added to the water and ammonia before being mixed with the remainder of the concentrate. Although this composition of Phthalocyanine Green Paste is described only in connection with Examples 2, 9 and 11 it is to be understood that it may be employed in any of the other examples or in any formulation falling within the scope of the appended claims, making suitable allowance for the variations in pigment and binder solids where necessary.

From the data given after each of the above formulation examples the percentage of pigment and binder solids in each example and the ranges of both pigment and binder solids applied per 100 square feet over a 1500 square foot area may be calculated. These ranges are as follows:

Pigment solids—.57 (Example 11) to .87 (Examples 1, 3–6, 8 and 10) ounces per 100 square feet.
Binder solids—.67 (Example 8) to 2.7 (Example 10) ounces per 100 square feet.

The percentage of pigment solids ranges from 56% (Example 8) to 24% (Example 10) and the percentage of binder solids ranges from 44% (Example 8) to 76% (Example 10). The ratio of binder solids to pigment solids is given for each formulation example and varies from approximately .75 to 1 (Example 8 has ratio of .77 to 1) to approximately 3 to 1 (Example 10 has ratio of 3.1 to 1).

It has been found that the above ranges are those which produce satisfactory results from the standpoint of color and performance.

The recommended degree of dilution given for each of the concentrates in the above formulation examples is that which produces a total volume of 6–12 gallons. The amount of satisfactory coverage depends on the type and condition of the grass to be treated as well as on the shade desired, and dilution of the concentrate within this range gives satisfactory results when applied to an area of from 1200 to 1800 square feet. If substantially less than 6 gallons is used the quantity of liquid will not be sufficient to cover the desired area uniformly. If substantially more than 12 gallons is used the quantity of liquid is more than can be held by the grass and consequently some of it will run off the grass to the ground and be wasted.

The preferred volume for a concentrate containing the right amount of solids for application to 1200–1800 square feet (after dilution) is one gallon. The principal reason for this particular volume is that it makes a low viscosity concentrate which mixes easily with the diluting water. A lower volume concentrate with a higher percentage of solids can be made as shown in Example 5.

The maximum practical amount of both thickener and wetting agent is 5%. Therefore, broad formulations showing workable variations are as follows:

1. Example 8:
    51–56% pigment solids
    39–44% binder solids
    5–0% thickener solids
    5–0% wetting and dispersing agent solids
2. Example 10:
    22–24% pigment solids
    68–76% binder solids
    5–0% thickener solids
    5–0% wetting and dispersing agent solids The optimum ratio of presently known binder solids to presently known pigment solids is approximately 2:1. As stated above, satisfactory results may be obtained by a ratio of binder solids to pigment solids in the range of approximately 0.75:1 to approximately 3.0:1. The preferred ratio of presently known binder solids to presently known pigment solids produces a coating composition which will provide a film having physical properties ideally suited to the treatment of grass for accomplishing the stated objection of the invention.

It will be noted that the properties of the different formulation examples are due to the composite effect of the various components of the formulation. The type and amount of binder has the greatest effect on the physical properties. Variations in abrasion resistance, adhesion, and tensile strength and elongation are for the most part due to a difference in the binder used. Crock resistance and weather resistance also vary with the binder used. Decreasing the ratio of binder solids to pigment solids results in a general decrease in quality. Elongation, abrasion resistance, weather resistance and crock resistance are lowered. Increasing the proportions of binder solids to pigment solids has the opposite effect. It is evident, of course, that some binders are superior to others and, therefore, produce equal or better results at lower ratios. For example, the film produced by the formulation of Example 7, which has a 1.3 to 1.0 ratio of binder solids to pigment solids, has the minimum allowable value for several physical properties, namely water absorption, abrasion resistance, adhesion, wet crock and tensile strength. On the other hand, the film produced by the formulation of Example 8, which has a different binder, has physical property values above the allowable minimum except for the wet crock requirement, although it has a binder solids to pigment solids ratio of only .77 to 1.0.

Use of inferior pigments, that is, less light-fast pigments results in a decrease in weather resistance due to poorer color retention. The amount and type of thickener and wetting and dispersing agents used affects the crock resistance and water resistance. Their effect on crock resistance is due to their action in assisting the binder to form a protective film around the pigment particles. Their effect on water resistance is due to their water-sensitivity.

Films having a high elongation tend to have low abrasion resistance because such highly elastic, flexible films are soft and, therefore, have less resistance to abrasive action than harder, less elastic films. On the other hand, some films with low elongation have low abrasion resistance, not because they are soft, but because they are brittle and develop holes by cracking when subjected to abrasive action, rather than by wearing through.

It will be noted from the test data on the various formulations given in the examples that there is quite a wide variation in the values for some of the physical properties. For example, elongation runs from 25% to 3000% and breaking strength from 1½ lbs. to 8 lbs. Elongation and breaking strength bear a certain relation to each other in that, as a rule, the greater the elongation the lower the breaking strength and vice versa. The greater the elongation the more elastic and flexible the film, and the lower the elongation the more brittle and rigid the film. A film with a low breaking strength may be entirely satisfactory if it has sufficient elongation in that when it is subjected to stress it will "give" or stretch rather than break and when the stress is removed it will recover its original position. As will be noted from the formulation examples, decreasing the ratio of binder to pigment lowers the elongation and increases the breaking strength in some cases.

Treatment of discolored grass with a coating having the lowest value for each physical property shown in the examples would be entirely practical and satisfactory for the permanent coloring and protection of discolored grass.

This application is a continuation-in-part of application Serial No. 582,647, filed May 4, 1956, and now abandoned.

What is claimed is:

1. A process for treating discolored grass to impart a permanent color to it and protect it from deterioration until the discolored grass is replaced by new growth which comprises the application to such grass of a protective colored film formed from an aqueous dispersion of a film-forming, water-insoluble resinous binder colored solely by water-insoluble coloring matter, the film from which in a 5 mil (0.005") thickness has the following physical properties when tested in accordance with procedures described herein: (1) Water resistance—not over 150% water absorption; (2) abrasion resistance—not less than 75 revolutions; (3) crock resistance—class 2 or better; (4) adhesion—not less than 1½ ounces; (5) breaking strength—not less than ¾ pound; (6) elongation—not less than 25%; and (7) weather resistance—not less than 100 hours.

2. A process for treating discolored grass which comprises the steps of treating it with an aqueous dispersion of a film-forming, water-insoluble resinous binder colored solely by water-insoluble coloring matter wherein the ratio of binder solids to coloring matter solids is in the range of approximately 0.75:1 to approximately 3.0:1, the film from which in a 5 mil (0.005") thickness has the following physical properties when tested in accordance with procedures described herein: (1) Water resistance—not over 150% water absorption; (2) abrasion resistance—not less than 75 revolutions; (3) crock resistance—class 2 or better; (4) adhesion—not less than 1½ ounces; (5) breaking strength—not less than ¾ pound; (6) elongation—not less than 25%; and (7) weather resistance—not less than 100 hours, and allowing the dispersion to dry through evaporation of its water content whereby a protective colored film tightly adheres to the treated grass to impart a permanent color to it and protect the treated grass from deterioration until it is replaced by new growth.

3. A process for treating discolored grass to impart a permanent color thereto and provide protection from deterioration until the treated grass is replaced by new growth, said process comprising applying to the discolored grass a pigmented, aqueous dispersion of a film-forming, water-insoluble, resinous binder, said aqueous dispersion having a solids content consisting essentially of from about 39% to 76% resinous binder solids, from about 56% to 22% pigment solids, from about 0% to 5% thickening agent and from about 0% to 5% wetting and dispersing agent, all of said percentages being expressed in terms of weight.

4. A process for treating discolored grass to impart a permanent color thereto and provide protection from deterioration until the treated grass is replaced by new growth, said process comprising applying to the discolored grass a pigmented, aqueous dispersion of a film-forming, water-insoluble, resinous binder wherein the ratio of binder solids to pigment solids is in the range of from about 0.75:1 to 3.0:1; said aqueous dispersion having a solids content consisting essentially of from about 39% to 76% resinous binder solids, from about 56% to 22% pigment solids; from about 0% to 5% thickening agent and from about 0% to 5% wetting and dispersing agent, all of said percentages being expressed in terms of weight.

5. A process for treating discolored grass to impart a permanent color thereto and provide protection from deterioration until the treated grass is replaced by new growth, said process comprising applying to the discolored grasss a pigmented, aqueous dispersion of a film-forming, water-insoluble vinyl resin wherein the ratio of vinyl resin solids to pigment solids is in the range of from about 0.75:1 to 3.0:1, said aqueous dispersion having a solids content consisting essentially of from about 39% to 76% vinyl resin, from about 56% to 22% pigment solids, from about 0% to 5% thickening agent and from about 0% to 5% wetting and dispersing agent, all of said percentages being expressed in terms of weight.

6. A process for treating discolored grasss to impart a permanent color thereto and provide protection from deterioration until the treated grass is replaced by new growth, said process comprising applying to the discolored grass a pigmented, aqueous dispersion of a film-forming, water-insoluble, acrylic resin wherein the ratio of acrylic resin solids to pigment solids is in the range of from about 0.75:1 to 3.0:1, said aqueous dispersion having a solids content consisting essentially of from about 39% to 76% acrylic resin, from about 56% to 22% pigment solids, from about 0% to 5% thickening agent and from about 0% to 5% wetting and dispersing agent, all of said percentages being expressed in terms of weight.

7. A process for treating discolored grass to impart a permanent color thereto and provide protection from deterioration until the treated grass is replaced by new growth, said process comprising applying to the discolored grass a pigmented, aqueous dispersion of a film-forming, water-insoluble, oil modified phthalic alkyd resin wherein the ratio of alkyd resin solids to pigment solids is in the range of from about 0.75:1 to 3.0:1, said aqueous dispersion having a solids content consisting essentially of from about 39% to 76% alkyd resin, from about 56% to 22% pigment solids, from about 0% to 5% thickening agent and from about 0% to 5% wetting and dispersing agent, all of said percentages being expressed in terms of weight.

8. A process for treating discolored grass to impart a permanent color thereto and provide protection from deterioration until the treated grass is replaced by new growth, said process comprising applying to the discolored grass a pigmented, aqueous dispersion of a film-forming, thermoplastic, water-insoluble resinous binder composed of at least one vinyl resin, the ratio of binder solids to pigment solids being within the range of from about 0.75:1 to 3.0:1; said aqueous dispersion having a about 56% to 22% pigment solids; from about 0% to 39% to 76% resinous binder solids, from about 56% to 22% pigment solids; from about 0% to 5% thickening agent and from about 0% to 5% wetting and dispersing agent, all of said percentages being expressed in terms of weight.

9. A process for treating discolored grass to impart a permanent color to it and protect it from deterioration until the discolored grass is replaced by new growth which comprises the application to such grass of a protective colored film formed from an aqueous dispersion of a film-forming, water-insoluble resinous binder, a film from which in a 5 mil (0.005") thickness has the following physical properties when tested in accordance with procedures described herein:

(1) Water resistance—not over 150% water absorption;
(2) Abrasion resistance—not less than 75 revolutions;
(3) Breaking strength—not less than ¾ pound;
(4) Adhesion—not less than 1½ ounces; and
(5) Weather resistance—not less than 100 hours.

10. A process for treating discolored grass to impart a permanent color thereto and provide protection from deterioration until the treated grass is replaced by new growth, said process comprising applying to the discolored grass a pigmented, aqueous dispersion of a film-forming, water-insoluble, resinous binder, said binder consisting of a mixture of resins, the film from which in a 5 mil (0.005") thickness has the following physical properties when tested in accordance with procedures described herein:

(1) Water resistance—not over 150% water absorption;
(2) Abrasion resistance—not less than 75 revolutions;
(3) Dry crock resistance—class 2 or better;
(4) Adhesion—not less than 1½ ounces;
(5) Breaking strength—not less than ¾ pound;
(6) Elongation —not less than 25%; and
(7) Weather resistance—not less than 100 hours.

11. A process for treating discolored grass to impart a permanent color to it and protect it from deterioration until the discolored grass is replaced by new growth which comprises the application to such grass of a protective colored film formed from an aqueous dispersion of a film-forming, water-insoluble resinous binder, a film from which in a 5 mil (0.005") thickness has the following physical properties when tested in accordance with procedures described herein:

(1) Water resistance—not over 150% water absorption;
(2) Abrasion resistance—not less than 75 revolutions;
(3) Breaking strength—not less than ¾ pound;
(4) Dry crock resistance—class 2 or better; and
(5) Weather resistance—not less than 100 hours.

References Cited in the file of this patent

UNITED STATES PATENTS

| | | |
|---|---|---|
| 1,484,656 | Koropp et al. | Feb. 26, 1924 |
| 1,935,706 | Joffe | Nov. 21, 1933 |
| 2,113,625 | Monteith | Apr. 12, 1938 |
| 2,203,274 | Anderson et al. | June 4, 1940 |
| 2,687,384 | Weisberg | Aug. 24, 1954 |
| 2,714,062 | Lockrey et al. | July 26, 1955 |
| 2,760,945 | Bodenschatz et al. | Aug. 28, 1956 |
| 2,786,821 | Gardner et al. | Mar. 26, 1957 |

FOREIGN PATENTS

| | | |
|---|---|---|
| 500,872 | Great Britain | Feb. 13, 1939 |

OTHER REFERENCES

Publication: Parker, "Fundamental Considerations—Latex Paints" published October 1952 in official Digest of Federation of Paint and Varnish Production Clubs, No. 333, pages 700 through 709.

Payne: "Latex Paints" published October 22, 1953, in Paint, Oil and Chemical Review, vol. 116, No. 22, pages 14, 16, 18, 20, 22, 42, 44, 45, 46, 48, 49.

UNITED STATES PATENT OFFICE
CERTIFICATE OF CORRECTION

Patent No. 2,870,037 January 20, 1959

Sherman Converse

It is hereby certified that error appears in the printed specification of the above numbered patent requiring correction and that the said Letters Patent should read as corrected below.

Column 4, line 30, for "slow" read -- snow --; column 5, line 43, for "fluocculation" read -- flocculation --; column 6, lines 53 to 58 should appear as shown below instead of as in the patent --

> Water resistance - - - - - 12.5% absorption.
> Abrasion resistance- - - - 2200 revolutions.
> Crock resistance, class:
>    Dry, 3.
>    Wet, 3.
> Adhesion - - - - - - - - - 1½ ounces.

column 12, line 73, for "objection" read -- object --; column 15, lines 32 and 33, for "about 56% to 22% pigment solids; from about 0% to 39% to 76% resinous binder solids," read -- solids content consisting essentially of from about 39% to 76% resinous binder solids, --.

Signed and sealed this 12th day of May 1959.

(SEAL)
Attest:
KARL H. AXLINE
Attesting Officer

ROBERT C. WATSON
Commissioner of Patents